United States Patent
Brown et al.

(10) Patent No.: US 8,296,784 B1
(45) Date of Patent: Oct. 23, 2012

(54) SOCIAL NETWORK APPLICATION PROGRAMMING INTERFACE

(75) Inventors: Nathan Brown, San Francisco, CA (US); M. Ian Graham, San Francisco, CA (US); Shantanu Talapatra, San Francisco, CA (US); Scott Dale, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,942

(22) Filed: Sep. 26, 2011

Related U.S. Application Data

(63) Continuation of application No. 13/077,394, filed on Mar. 31, 2011.

(51) Int. Cl.
- G06F 3/00 (2006.01)
- G06F 9/54 (2006.01)
- G06F 7/04 (2006.01)
- G06F 17/30 (2006.01)
- G06Q 99/00 (2006.01)

(52) U.S. Cl. .......... 719/328; 719/330; 726/2; 726/3; 726/4; 726/5; 705/319

(58) Field of Classification Search .......... None
See application file for complete search history.

(56) References Cited

U.S. PATENT DOCUMENTS

| | | | |
|---|---|---|---|
| 6,769,068 B1 * | 7/2004 | Brozowski et al. | 726/5 |
| 7,370,335 B1 * | 5/2008 | White et al. | 719/328 |
| 7,565,494 B1 | 7/2009 | Todd et al. | |
| 7,657,652 B1 | 2/2010 | Balaji | |
| 7,801,971 B1 | 9/2010 | Amidon et al. | |
| 7,827,208 B2 | 11/2010 | Bosworth et al. | |
| 7,974,983 B2 | 7/2011 | Goeldi | |
| 8,078,741 B2 | 12/2011 | Barnfield et al. | |
| 8,171,114 B1 | 5/2012 | Dale et al. | |
| 2002/0065899 A1 | 5/2002 | Smith et al. | |
| 2005/0216550 A1 | 9/2005 | Paseman et al. | |
| 2006/0143303 A1 | 6/2006 | Serenyi et al. | |
| 2009/0049525 A1 * | 2/2009 | D'Angelo et al. | 726/4 |
| 2009/0292814 A1 | 11/2009 | Ting et al. | |
| 2009/0307332 A1 | 12/2009 | Litwin | |
| 2010/0100952 A1 | 4/2010 | Sample et al. | |
| 2010/0114788 A1 * | 5/2010 | White et al. | 705/319 |
| 2010/0144788 A1 | 6/2010 | Stensbol et al. | |
| 2010/0217869 A1 | 8/2010 | Esteban et al. | |
| 2010/0235578 A1 | 9/2010 | Sih et al. | |
| 2010/0274815 A1 | 10/2010 | Vanasco | |

(Continued)

OTHER PUBLICATIONS

Mulligan, "Open API Standardisation for the NGN Platform" 2008, ITU.*

(Continued)

Primary Examiner — Qing Wu
(74) Attorney, Agent, or Firm — Schwegman, Lundberg & Woessner, P.A.

(57) ABSTRACT

Disclosed in one example is a method for interfacing with multiple social networks. The method includes receiving a call from a social networking service agnostic social networking application for one of a plurality of social networking functions in a first format, translating the call in the first format to a call in a second format, the second format being one of a plurality of heterogeneous social networking service application programming interface formats, and passing the call in the second format to a first social networking service by utilizing a first social networking service application programming interface.

17 Claims, 10 Drawing Sheets

U.S. PATENT DOCUMENTS

| | | | |
|---|---|---|---|
| 2011/0047182 A1* | 2/2011 | Shepherd et al. | 707/780 |
| 2011/0113094 A1 | 5/2011 | Chunilal | |
| 2011/0153759 A1 | 6/2011 | Rathod | |
| 2011/0154445 A1* | 6/2011 | Schmidt-Karaca et al. | 726/4 |
| 2011/0161478 A1 | 6/2011 | Formo et al. | |
| 2011/0162038 A1 | 6/2011 | Chunilal | |
| 2011/0219190 A1 | 9/2011 | Ng et al. | |
| 2011/0231489 A1 | 9/2011 | Rathod | |
| 2011/0238755 A1 | 9/2011 | Khan et al. | |
| 2011/0251970 A1 | 10/2011 | Oien et al. | |

OTHER PUBLICATIONS

"Web Application Toolkit for the Social Networking APIs" Jul. 15, 2010.*

"Microsoft Computer Dictionary", 2002, Microsoft Press, Fifth Edition, p. 499.*

Microsoft Computer Dictionary, Fifth Edition, Microsoft Press, (2002), p. 499.

U.S. Appl. No. 13/077,394, Examiner Interview Summary Mailed Feb. 8, 2012, 3 pgs.

U.S. Appl. No. 13/077,394, Non Final Office Action Mailed Dec. 22, 2011, 16 pgs.

U.S. Appl. No. 13/077,466, Non Final Office Action mailed Feb. 16, 2012, 6 pgs.

U.S. Appl. No. 13/244,878, Non Final Office Action mailed Jan. 30, 2012, 8 pgs.

U.S. Appl. No. 13/244,885, filed Sep. 26, 2011, 44 pgs.

U.S. Appl. No. 13/244,885, Notice of Allowance mailed Feb. 24, 2012, 13 pgs.

U.S. Appl. No. 13/244,888, Non Final Office Action mailed Feb. 29, 2012, 9 pgs.

U.S. Appl. No. 13/244,894, Examiner Interview Summary mailed Mar. 5, 2012, 3 pgs.

U.S. Appl. No. 13/244,894, Non Final Office Action Mailed Dec. 9, 2011, 16 pgs.

U.S. Appl. No. 13/244,894, Response filed Feb. 16, 2012 to Non Final Office Action mailed Dec. 16, 2011, 13 pgs.

U.S. Appl. No. 13/244,938, Non Final Office Action mailed Dec. 22, 2011, 18 pgs.

U.S. Appl. No. 13/244,941 , Response filed Mar. 21, 2012 to Non Final Office Action mailed Dec. 21, 2011, 12 pgs.

U.S. Appl. No. 13/244,941, Examiner Interview Summary mailed Feb. 8, 2012, 3 pgs.

U.S. Appl. No. 13/244,941, Non Final Office Action mailed Dec. 21, 2011, 15 pgs.

U.S. Appl. No. 13/244,942, Examiner Interview Summary mailed Feb. 7, 2012, 3 pgs.

"OpenSocial: Frequently Asked Questions", Google.com, 2011 [retrieved on Dec. 9, 2011]. Retrieved from <http://code.google.com/apis/opensocial/faq.html>, 2 pgs.

"Social network aggregation", Wikipedia.org, Nov. 11, 2011 [retrieved on Dec. 6, 2011]. Retrieved from <http://en.wikipedia.org/wiki/Social_network_aggregation>, 3 pgs.

"Socialstream", [Online]. Carnegie Mellon University HCII, 2006. [retrieved on Dec. 6, 2011]. Retrieved from < http://www.hcii.cmu.edu/M-HCI/2006/SocialstreamProject/socialstream.php>, 2 pgs.

"Socialstream Features", [Online]. Carnegie Mellon University HCII, 2006. [retrieved on Dec. 6, 2011]. Retrieved from Internet: < http://www.hcii.cmu.edu/M-HC1/2006/SocialstreamProject/features.php>, 3 pgs.

"The OAuth 1.0 Protocol", E. Hammer-Lahav (ed.), Internet Engineering Task Force (IETF), Request for Comments: 5849, Category: Informational, ISSN: 2070-1721, (Apr. 2010), 38 p.

"The OAuth 2.0 Authorization Protocol", E. Hammer-Lahav et al. (eds.), draft-ietf-oauth-v2-13, Network Working Group, Obsoletes: 5849 (if approved), Intended status: Standards Track, (Feb. 16, 2011), 44 p.

Morin, Dave, "Announcing Facebook Connect", [online]. Facebook, May 9, 2008 [retrieved on Feb. 14, 2012]. Retrieved from < developers.facebook.com/blog/post/108/ >, 2 pgs.

Perez, Sarah, "Vinehub: New Social Network Connector to Aggregate, Update Multiple Services", ReadWriteWeb, May 20, 2010 [retrieved on Dec. 6, 2011]. Retrieved from <http://www.readwriteweb.com/archives/vinehub_new_social_network_connector_to_aggregate_update_multiple_services.php#.TuJLoUXQb3o.email>, 3 pgs.

Schroeder, S., "20 Ways to Aggregate Your Social Networking Profiles", mashable.com, Jul. 17, 2007. Retrieved from <http://mashable.com/2007/07/17/social-network-aggregators/>, 8 pgs.

"U.S. Appl. No. 13/077,394, Notice of Allowance mailed May 23, 2012", 7 pgs.

"U.S. Appl. No. 13/077,394, Response filed Mar. 22, 2012 to Non Final Office Action mailed Dec. 22, 2011", 15 pgs.

"U.S. Appl. No. 13/077,466, Response filed May 16, 2012 to Office Action mailed Feb. 16, 2012", 10 pgs.

"U.S. Appl. No. 13/244,878, Notice of Allowance mailed May 11, 2012", 5 pgs.

"U.S. Appl. No. 13/244,878, Preliminary Amendment filed Dec. 16, 2011", 3 pgs.

"U.S. Appl. No. 13/244,878, Response filed Apr. 30, 2012 to Non Final Office mailed Jan. 30, 2012", 10 pgs.

"U.S. Appl. No. 13/244,885, Examiner Interview Summary mailed Feb. 24, 2012", 1 pg.

"U.S. Appl. No. 13/244,885, Preliminary Amendment filed Dec. 12, 2011", 3 pgs.

"U.S. Appl. No. 13/244,888, Examiner Interiview Summary mailed Apr. 9, 2012", 4 pgs.

"U.S. Appl. No. 13/244,888, Preliminary Amendment filed Dec. 12, 2011", 3 pgs.

"U.S. Appl. No. 13/244,888, Response filed Apr. 30, 2012 to Non Final Office Action mailed Feb. 29, 2012", 11 pgs.

"U.S. Appl. No. 13/244,938, Final Office Action mailed May 21, 2012", 17 pgs.

"U.S. Appl. No. 13/244,938, Response filed Mar. 22, 2012 to Non Final Office Action mailed Dec. 22, 2011", 15 pgs.

"U.S. Appl. No. 13/244,941, Final Office Action mailed May 21, 2012", 12 pgs.

"SocialStream", [Online Video]. Carnegie Mellon University HCII, 2006. [retrieved on Apr. 30, 2012]. Retrieved from the Internet: <URL: http://www.hcii.cmu.edu/MHC1/2006/SocialstreamProject/Socialstream_demo.mov > (5 minutes, 6 seconds) 29.0 MB.

Brown, Nathan, et al., "Social Network Application Programming Interface", U.S. Appl. No. 13/244,942, Application Filed Sep. 26, 2011, 59 pgs.

Brown, Nathan, "Social Network Application Programming Interface", U.S. Appl. No. 13/077,394, Application, filed Mar. 31, 2011, 51 pgs.

Brown, Nathan, "Social Network Application Programming Interface", U.S. Appl. No. 13/244,941, Application Filed Sep. 26, 2011, 58 pgs.

* cited by examiner

SOCIAL NETWORK APPLICATION PROGRAMMING INTERFACE

CLAIM OF PRIORITY

This application is a continuation of and claims the benefit of priority under 35 U.S.C. §120 to U.S. patent application Ser. No. 13/077,394, filed on Mar. 31, 2011, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Zynga, Inc, 2011. All Rights Reserved.

BACKGROUND

A social networking service is an online service, platform or site that allows members to build or reflect social networks or social relations among members. Typically, members construct profiles, which may include personal information such as name, contact information, employment information, photographs, personal messages, status information, links to web related content, blogs, and so on. Typically, only a portion of a member's profile may be viewed by the general public and/or other members.

The social networking site allows members to identify and establish links or connections with other members in order to build or reflect social networks or social relations among members. For instance, in the context of a business networking service, a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member then has the option of accepting or declining the invitation. If the second member accepts the invitation, the first and second members are connected.

In general, a connection or link may represent or may be otherwise associated with an information access privilege, such that a first person who has established a connection with a second person is, via the establishment of that connection, authorizing the second person to view or access non-publicly available portions of their profiles. Of course, depending on the particular implementation of the business/social networking service, the nature and type of the information that may be shared as well as the granularity with which the access privileges may be defined to protect certain types of data may vary greatly.

A variety of different social networking services have gained popularity, including FACEBOOK® of Palo Alto, Calif., MYSPACE® of Beverly Hills, Calif. and run by News Corp., LINKEDIN® of Mountain View, Calif., TWITTER® of San Francisco, Calif., and the like. These sites often allow for third party applications to utilize certain functionality provided by the host social networking service. In some examples, these third party applications may utilize certain user interface (UI) elements of the social networking service, access personal information about a user (including profile information), and send and receive social interactions, such as messages, to the user of the third party application or to their connections. FACEBOOK®, for example, allows developers to create applications which are integrated into the FACEBOOK® user interface and with the FACEBOOK® social networking system. In some examples, these applications may include games such as CITYVILLE®, FARMVILLE®, and MAFIA WARS®, all developed by ZYNGA®, Inc. of San Francisco, Calif. These applications appear in a FACEBOOK® page, and make use of various features of FACEBOOK®, such as contacting friends to encourage them to join the game and play with the user and the like.

The social networking services integrate with these applications by providing to these applications an Application Programming Interface or "API." In general, an API is a particular set of rules and specifications that a software program may follow to access and make use of the services and resources provided by another particular software program that implements that API. The API serves as an interface between different software programs and facilitates their interaction.

Figure 1:
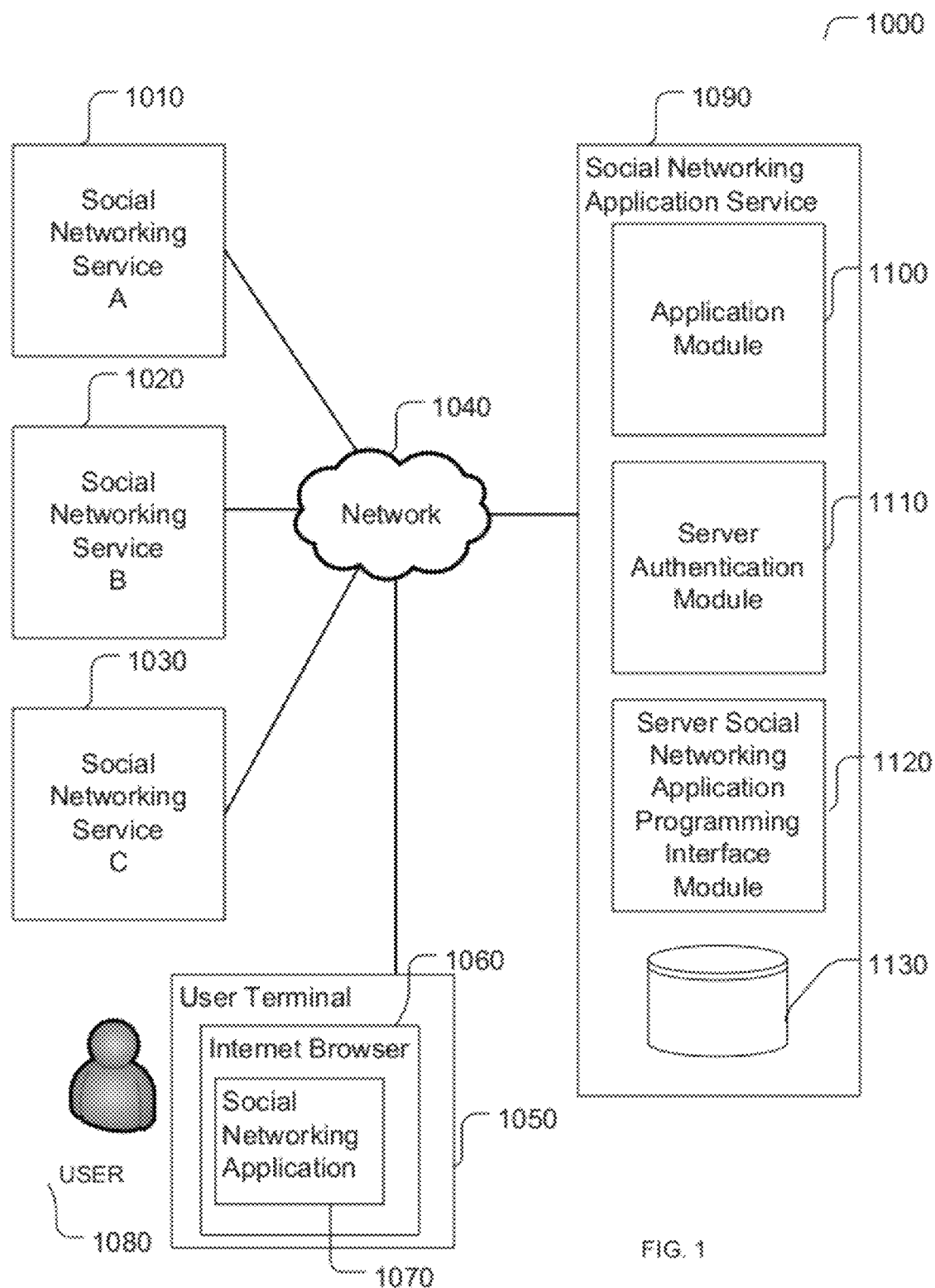
FIG. 1 shows in one example of the present disclosure a system showing social networking services, a network, a user terminal and a social networking application service.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The API of one social network is not always the same as the API of a different social network. For example, the API format for FACEBOOK® is different than the API format for MYSPACE®. Format differences include the mechanism to submit the API requests (common methods include PHP, AJAX, HTML, or XML tags, JavaScript, and the like) and the structure of the requests (i.e. the arguments passed, their ordering, and the like). While the differences in the structures of the requests may often be accounted for based on the different mechanisms used (e.g., a JavaScript call will be a different structure than a PHP call), even when the mechanisms are the same, the structures of the requests often differ between social networking services (e.g. the arguments passed and the order in which they are passed to the social networking service will be different). As a result, third party applications developed for social networks that utilize the social networking APIs are typically social networking service dependent.

For example, to post a message to another user in LINKEDIN®, a developer may POST an XML file to a particular URL in a particular format. An example of the LINKEDIN® messaging format is:

```
<?xml version='1.0' encoding='UTF-8'?>
<mailbox-item>
    <recipients>
    <recipient>
        <person path='/people/~'/>
    </recipient>
    <recipient>
        <person path="/people/janedoe"/>
    </recipient>
    </recipients>
    <subject>Hello—Sample Message.</subject>
    <body>Hello World!</body>
</mailbox-item>
```

On the other hand, to post a message to another user on FACEBOOK®, developers utilize a JavaScript call according to a particular format. One example is:

```
FB.ui(
{
method: 'feed',
name: 'Facebook Dialogs',
link: 'http://someurl.com',
picture: 'http://somepictureurl.jpg',
caption: 'Hello-Sample Message',
description: 'Hello—Sample Message',
message: 'Hello World!'
},
function(response) {
if (response && response.post_id) {
    alert('Post was published.');
} else {
    alert('Post was not published.');
}
}
);
```

Application developers that wish to develop applications for more than one social network need to spend effort and expense in producing a separate application for each social network. Additionally, any changes in the API of a social network will require retooling of all applications written for that social network. Thus if a developer has several applications written for a particular social network, each application will have to be manually updated. Recognizing these issues, an effort has recently sprung up to try and provide a standardized API for social networking services. OpenSocial, run by GOOGLE®, of Mountain View Calif. attempts to define a common API across multiple social networks. This effort, however, requires that social networks standardize their APIs to those defined by OpenSocial, many of which have not and will not do so.

Disclosed in one example is a system and method for facilitating the development of applications that may utilize the provided functions of a number of disparate social networks. The system and method defines a social networking service agnostic social networking application programming interface (SNAPI) that social networking applications may call to provide various social networking service functionalities. The SNAPI then converts these calls from the SNAPI format into a number of social networking service-specific API formats. This conversion includes both the method and the structure, including mapping the arguments passed via the SNAPI call to the proper locations in the respective network specific API call. For example, a SNAPI call made in JavaScript may be converted to a valid social networking service API call in PHP. The arguments passed by the social networking application in the SNAPI JavaScript call may be used to fill in the arguments in the PHP social networking service-specific API call. Both SNAPI and social networking service-specific API formats may include HTML or XML tags, JavaScript calls, PHP calls, Representative State Transfer (RESTful) calls, Python calls, Perl calls, AJAX calls, and any other means for accessing an API.

FIG. 1 shows one example system 1000. Typically, a user, such as user 1080, will access and communicate with one or more social networking services 1010-1030 through network 1040. In some examples, social networking services 1010-1030 may include FACEBOOK®, MYSPACE®, LINKEDIN®, TWITTER®, and the like. In some examples, this communication may be done through the user terminal 1050. User terminal 1050, in some examples, may include a personal computer (PC), laptop computer, tablet computer, smart phone or other cellular telephone, electronic book reader, or any other device that allows a user to access the functionality of the social networking service. In some examples an internet browser 1060 of the user terminal 1050 may be used to access the social networking services 1010-1030 using network 1040. Internet browser 1060, in some examples may include Internet Explorer® from Microsoft Corp., Redmond, Wash. Network 1040 may be any method by which user terminal 1050 may communicate with one or more social networking services 1010-1030. In some examples, network 1040 may include the internet, a wide area network "WAN", a local area network "LAN", cellular network, or any other method of allowing the user terminal 1050 to connect with the social networking service, and the like. While three social networking services are shown in FIG. 1 (1010-1030), it will be appreciated by those skilled in the art that the system and methods of the current disclosure are applicable to more or less than three social networks.

Typically, when a user 1080 accesses a third party application (such as a game) associated with one of the social networking services 1010-1030, the user 1080 selects the application via the social networking service 1010-1030, which then re-directs the user to access the application on another server. In some examples, this server may be located on a social networking application service 1090. The user's browser connects to the application server, downloads the application client, then displays or executes the application. In some examples, this social networking application 1070 may be or include HTML, XML, JavaScript, Adobe Flash, Microsoft Silverlight, and the like. The social network 1010-1030 from which the user selected the content may be called the host social network. The user's browser then executes or displays this social networking application 1070 until the user 1080 decides to exit, or the application closes or otherwise ends.

In some examples, while the application 1070 executes, it communicates with the host social networking service to which it is associated. Example communications include authenticating, authorizing, utilizing the user interface elements of the host social network, obtaining social network information about user 1080 (such as connections with other users), sending messages to other users, and the like.

In some examples, social networking application 1070 may communicate with social networking application service 1090. Social networking application service 1090 may include various functions to assist social networking application 1070. In some examples, social networking application service 1090 may include application module 1100, which stores and delivers to user terminals (including user terminal 1050) social networking application 1070 from data store 1130. In other examples, application module 1100 may contain execution logic for social networking application 1070. Examples of this execution logic include responding to user actions and inputs; payment and purchasing information for purchasing the application or unlocking, accelerating, or making available various features in the application 1070; sending messages to and from various other users of the application; storing application data in data store 1130; providing various media files such as graphics, video, and sound files; and the like. While social networking application service 1090 is shown in FIG. 1 as one system, the components and the functionality of social networking application service 1090 may be distributed across multiple systems.

In some examples, social networking application service 1090 includes a server authentication module 1110, which works with client authentication module 2010 (FIG. 2) to authenticate or authorize social networking application 1070 with a variety of social networking services 1010-1030.

In some examples, social networking application service 1090 includes a server social networking application programming interface module (server SNAPI module) 1120 which may assist client social networking application programming interface module (client SNAPI) 2050 (FIG. 2) on social networking application 1070 in implementing the SNAPI. Server SNAPI 1120 and client SNAPI 2050 will be discussed in more detail later.

Figure 2:
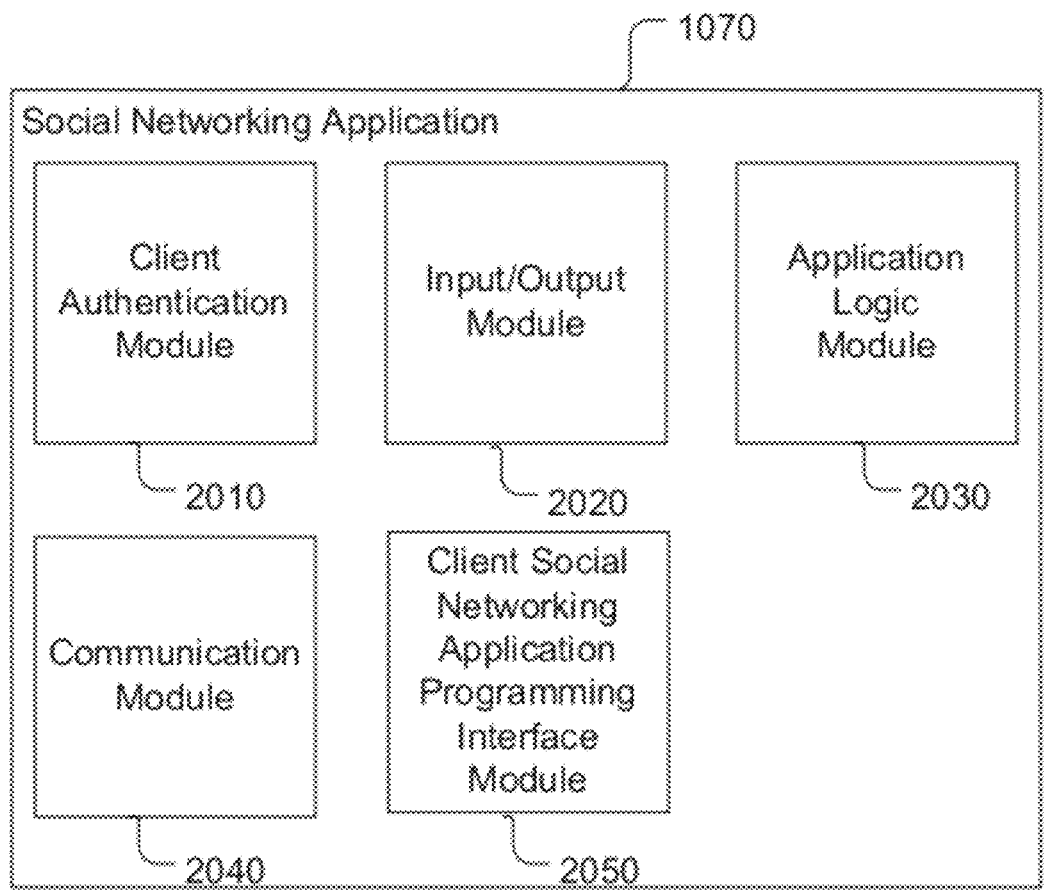
FIG. 2 shows in one example of the present disclosure a social networking application.

One example social networking application 1070 is shown in FIG. 2. A social networking application 1070 is any application which utilizes, or is capable of utilizing, the API of one or more social networking services. In some examples social networking application 1070 may contain an input/output module 2020. Input/output module 2020 communicates with the user 1080, through user terminal 1050. Input/output module 2020 may be responsible for causing the user interface of the social networking application 1070 to be displayed and for handling user inputs.

Application logic module 2030, in some examples, may be responsible for implementing the primary functions of the social networking application 1070. For example, in the case of a game, the game logic and the game rules are implemented by application logic module 2030. In some examples, application logic module 2030 communicates with application module 1100 using communication module 2040 to communicate changes in application state and user interactions and to receive instructions for processing application events. In other examples, application logic module 2030 has all the logic necessary to process any application state changes and user interactions and to handle application events. In yet other examples, application logic module 2030 has the logic necessary for handling some application state changes, user interactions and application events while the remaining functionality may be handled by application module 1100.

Communication module 2040 communicates with social networking service 1010-1030 and social networking application service 1090. In some examples, this communication may include network communication across network 1040. A variety of methods of communication may be used, including AJAX, page loads, other HTTP communications, TCP sockets, UDP datagrams, and the like.

Social networking application 1070 may include a client authentication module 2010 for managing authentication with one or more social networking services 1010-1030. Client authentication module 2010 works with server authentication module 1110 of social networking application service 1090 to perform authentication and authorization procedures with the various social networks 1010-1030. Authentication and authorization, in some examples, includes user authentication, which provides the identity of the user to the social networking service and the application associated with the social networking service; authorization, in which the user authorizes the social networking application 1070 to access certain personal information and take certain actions; application authentication, which allows the social networking service to verify that a trusted application is asking for access and to provide the requested level of access; and the like. In some examples, authentication and authorization with the social network are necessary to utilize the various APIs of the social networking services 1010-1030. In some examples, when a user launches social networking application 1070, client authentication module 2010 authenticates and authorizes the social networking application 1070 with the host social networking service. The host social networking service may then pass back authentication information. In some examples, this authentication information may be a token key that identifies a session. Client authentication module 2010 then passes this authentication information to server authentication module 1110, which stores this information for later use by other social networking applications, including other social networking applications that are hosted on different social networking services. In general, the authentication information may include any information necessary to utilize an application programming interface on a social networking service.

Server authentication module 1110 of social networking application service 1090 receives this authentication information. Server authentication module 1110 then stores this authentication information in data store 1130. Server authentication module 1090 may then check data store 1130 for any other authentication information relating to that user in other social networks 1010-1030 for the same or other applications. In some cases, the authentication information may be related to a particular application available on multiple different social networks, and in other cases it may be application independent. If any other social networks have valid authentication information, server authentication module 1110 may then send that authentication information to client authentication module 2010 so that social networking application 1070 may utilize the API of other social networks.

Server authentication module 1110 may be responsible for determining if user 1080 has active sessions on social networking services other than the social networking service that is associated with the currently running social networking application 1070. Because different social networks may have different user identification systems, in order to perform this association, server authentication module 1110 may use a variety of factors to associate the user 1080 of social networking application 1070 with authentication and authorization information previously stored in data store 1130. Some factors include member ID, name, social graphs (common friends), address, phone number, email address, TWITTER® account, website links, bank accounts, credit card information, and any other personal identifiable information. In yet other cases, the social networking application 1070 may prompt user 1080 to identify any other user accounts on other social networking services. Once an association is found, the server authentication module 1110 may store this association of user 1080 to the various social networking services for faster processing when looking up authentication information in the future.

For example, if user 1080 is named "John Smith," his phone number is "555-555-5555," and he is a member of social networking service A 1010 with member ID "1234" and social networking service B 1020 with member ID "5678" upon launching a social networking application 1070 associated with social networking service A 1010, social networking application 1070 sends the authentication/authorization information to server authentication module 1110 along with identifying information for user 1080. Server authentication module 1110 has no record of any other sessions for user 1080 and does not pass back any sessions to social networking application 1070. Once user 1080 launches another social networking application on social networking service B 1020, which also communicates with social networking application service 1090, the server authentication module 1110 determines (based on items such as name, phone number, and other factors) that user 1080 has member account "1234" on social networking service A 1010 and "5678" on social networking service B 1020. The association may be saved for later use, and the previous session on social networking service A 1010 may be sent to the calling social networking application.

In some examples, social networking application 1070 may include client social networking application programming interface module 2050 (client SNAPI module 2050). Client SNAPI module 2050 frees social networking application 1070 from being specific to one particular social networking service 1010-1030 by providing a standardized API that may then mapped to a variety of disparate social networking API calls. Thus, client SNAPI module 2050 takes as input a social networking service-independent API call from other components of social networking application 1070 and converts those SNAPI calls into social networking service-specific API calls for a variety of social networking services. New social networking services may be added or the API for a social networking service may be modified and the only impacted change would be client SNAPI module 2050 and/or server SNAPI module 1120.

In some examples, the client SNAPI module 2050 converts the SNAPI call into the API format of the host social network. In other examples, the client SNAPI module 2050 may convert the SNAPI call into the API format of multiple social networks, such that SNAPI allows for communication across social networking services 1010-1030. In this way, an application hosted on one social networking service may communicate with, or utilize the APIs of, one or more other social networking services. In some examples, this may allow the social networking application to aggregate information about user 1080 and allow user 1080 access to all of user 1080's connections.

Supporting many social networks 1010-1030 may result in a large amount of code in the client SNAPI module 2050, which may result in large social networking application 1070 load times as well as memory or other performance issues. In some examples, the client SNAPI module 2050 may include a number of translation modules that convert the SNAPI formatted call to one or more social networking service-specific API calls. The translation modules may convert one or more SNAPI calls into one or more API calls for one or more social networking services. In some examples, the client SNAPI module 2050 only loads certain translation modules in order to minimize application size and load times. The particular translation modules to be loaded may be selected based upon a number of factors, including the translation modules selected by the social networking application 1070 or the user 1080, the translation modules necessary to convert SNAPI calls to the host social network API calls, the translation modules necessary to support conversion of the SNAPI calls to the social network API calls of the social networks to which the user has an active session, or any other selection criteria. In this way, the client SNAPI module 2050 may dynamically adjust to provide the SNAPI services while minimizing performance degradation.

In some cases, the social networking application 1070 may be implemented as an IFRAME on the social networking service 1010-1030. In some cases, browser or social networking service restrictions prevent communication by social networking application 1070 to any host besides the server where the social networking application 1070 was originally downloaded, which in some examples would be social networking application service 1090. In these cases, certain calls to social networking services 1010-1030 may be sent from the client SNAPI module 2050 of social networking application 1070 to the server SNAPI module 1120 of social networking application services 1090 in order to work around these restrictions. The server SNAPI module 1120 takes the API call sent by the client SNAPI module 2050, translates it, and issues it to the correct social networking service 1010-1030. The server SNAPI module 1120 also processes any replies from social networking service 1010-1030 and forwards replies to the client SNAPI module 2050. In some cases, the server SNAPI module 1120 and the client SNAPI module 2050 communicate directly through local PHP methods. In some examples, the client SNAPI module 2050 makes a remote request for a SNAPI call by utilizing PHP to perform an HTTP query to a URL associated with the server SNAPI module 1120. The server SNAPI module 1120 recognizes the post, reads the query's parameters and processes the request.

Figure 3:
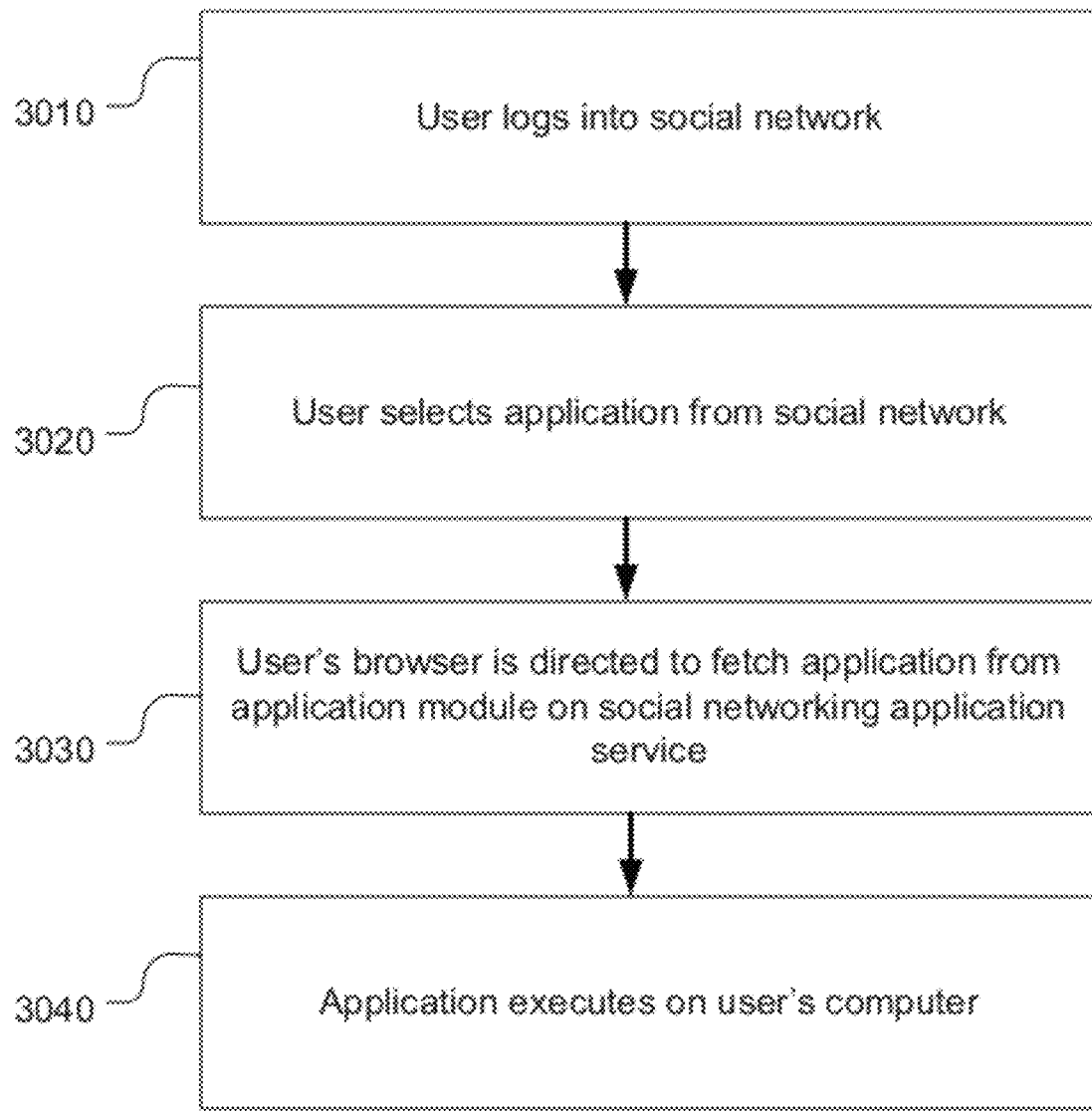
FIG. 3 shows a method, according to one example of the present disclosure.

FIG. 3 shows one example method of the present disclosure. At 3010, a user logs onto a social network 1010-1030. Usually, this requires the user to enter certain identification and authentication information. In some examples, this may be a username and a password. At operation 3020, the user selects an application from the social network. In some examples, the application may be a game, a productivity application such as a word processor, a spreadsheet, or messaging application, a marketplace application, a media application, a dating application, and any other application that may be associated with a social networking service. In other examples, the user may visit social networking application service 1090, which may then prompt the user 1080 to login to one of the social networking services 1010-1030 through the use of certain authentication and authorization APIs provided by social networking services 1010-1030.

At operation 3030, the user's browser may be directed by the social networking service to fetch or download an application from an application module 1100 on a social networking application service 1090. In some examples, the application may be displayed in an IFRAME HTML element. In operation 3040, the application executes on a user's computer or terminal 1050.

Figure 4:
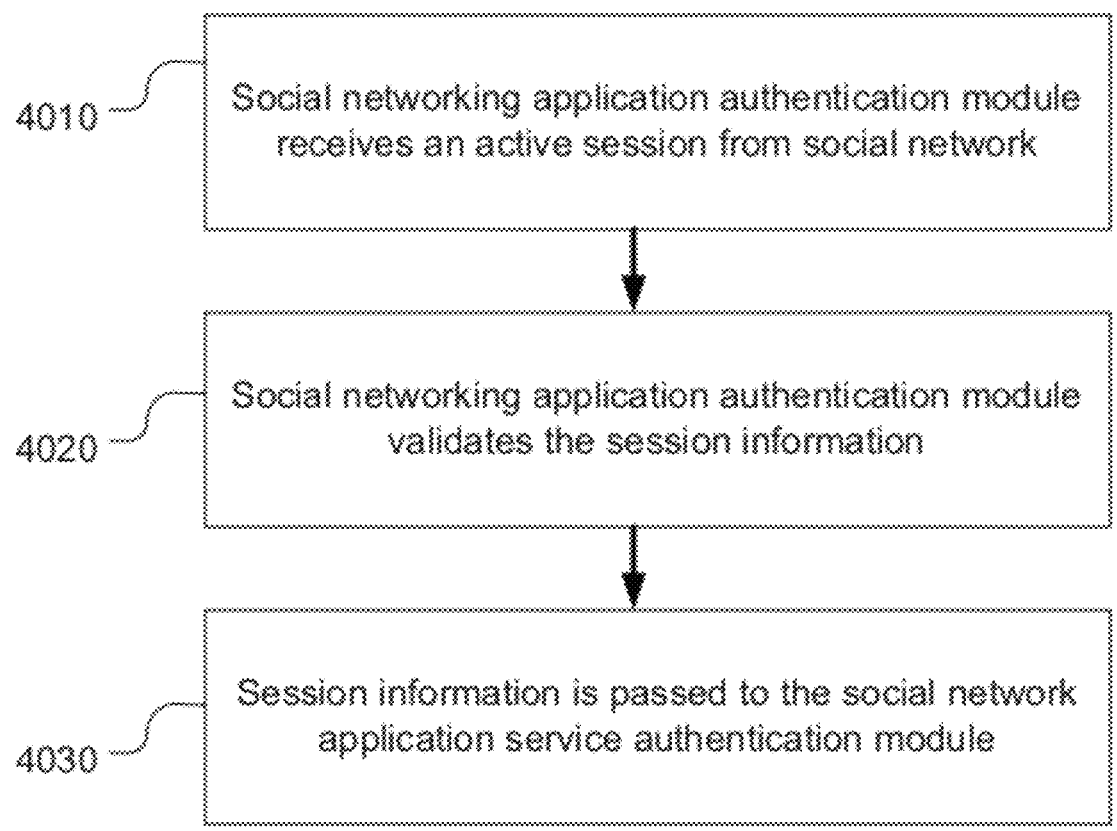
FIG. 4 shows a method, according to one example of the present disclosure.

Turning now to FIG. 4, at operation 4010, the social networking application client authentication module 2010 authenticates and authorizes with the host social networking service, receiving authentication information in return.

In some examples, this social networking application client authentication module 2010 validates the session information at operation 4020 by ensuring that the authentication information has not expired and is correctly formed. At operation 4030, the authentication information may then be passed to the social network application service server authentication module 1110 in order to store the session information and to signal social networking application service server authentication module 1110 to send to the social networking application client authentication module 2010 the authentication information of other social networks in order to allow API calls to other social networks.

Figure 5:
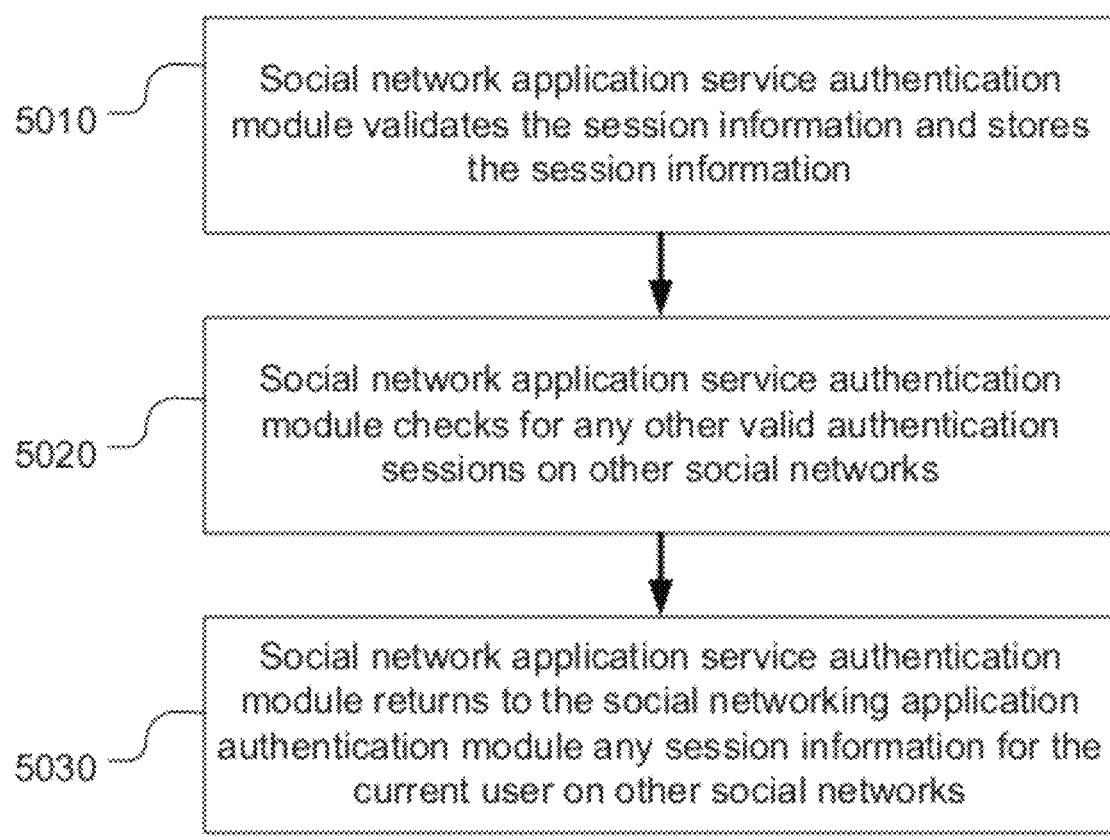
FIG. 5 shows a method, according to one example of the present disclosure.

FIG. 5 shows one example server authentication module method. At operation 5010, the server authentication module 1110 validates the authentication information sent by client authentication module 2010. This validation process, in some examples, may be the same or similar to that of client authentication module 2010. Server authentication module 1110 then stores the authentication information in data store 1130. Server authentication module 1110 then checks for any other valid authentication information for other social networks, at operation 5020. If any are found, the server authentication module 1110 may send information regarding that authentication information to client authentication module, at operation 5030, so the client authentication module 2010 may utilize the API of those social networking services.

Figure 6:
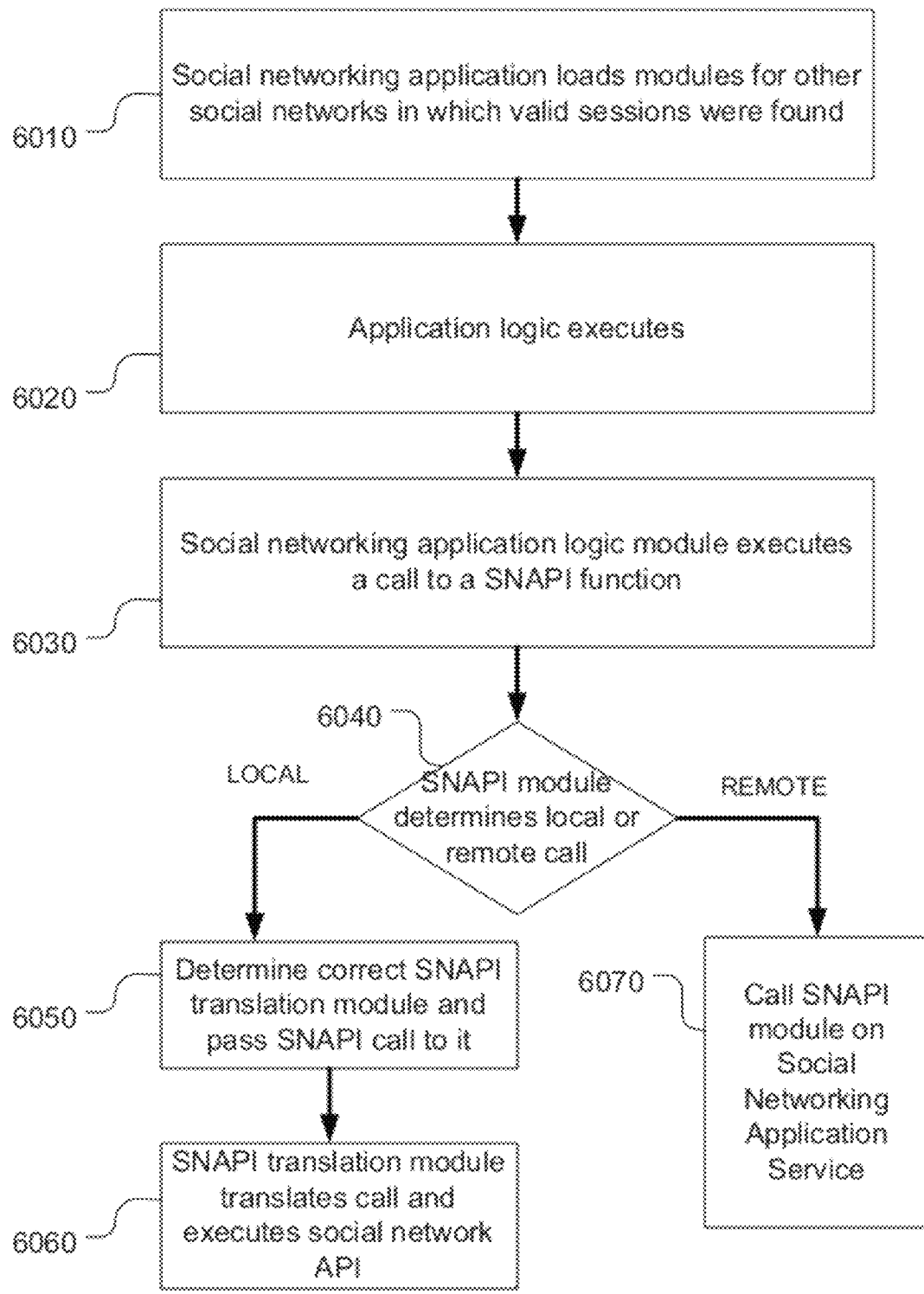
FIG. 6 shows a method of translating SNAPI calls into social network specific calls, according to one example of the present disclosure.

Turning now to FIG. 6, in some examples the social networking application loads only the parts (i.e. translation modules) of the social networking application client SNAPI module 2050 used to transform the SNAPI calls into the various social networking service 1010-1030 API calls at operation 6010. As already mentioned, in some examples, only those translation modules of client SNAPI module 2050 are loaded that are needed to translate SNAPI calls into native social networking API calls on the various social networking services on which an active session is found. In some examples, client SNAPI code may be a JavaScript or other code module loaded from the social networking application service 1090. In some examples, each translation module of client SNAPI module 2050 handles a specific social networking service 1010-1030; that is, it transforms all SNAPI calls into the corresponding native social networking API calls for one social networking service 1010-1030. In other examples, each translation module may handle translating SNAPI calls into multiple social networking services 1010-1030. In yet other examples, one module may handle a subset of SNAPI calls for a particular social networking service 1010-1030.

In some examples, once the requisite SNAPI translation modules are loaded, the application logic executes in operation 6020. In some examples, if no authentication information is found, no SNAPI translation modules are loaded and the application terminates. In other examples, if no authentication information is found, then the application requests that the host social networking service refresh the session information. In still other examples, the application continues but without certain functionality utilizing the social features of the social networking application.

In operation 6030, the social networking application makes a request for a social networking function. An example social networking function may include requesting that a social network provide a list of a user's social connections. The request may be formatted as a social networking service-independent SNAPI API call. This format may be the same regardless of what social networking service the application is associated with and regardless of which social networking service executes the API call.

In some examples, certain API calls are executed remotely on server SNAPI module 1120 on social networking application service 1090. In some cases, this may be done to avoid browser or other security settings or other restrictions on the social networking application 1070. In other examples, this may be done to speed processing. For example, if social networking application 1070 queries all social networks 1010-1030 for a list of user 1080's connections, sending the queries and waiting for the replies might delay social networking application 1070 unacceptably. In these cases, server SNAPI module 1120 may assist client SNAPI module 2050 in making these API calls.

In operation 6040, in some examples, the client SNAPI module 2050 may determine whether a remote call or a local call may be made. In some examples, the determination may be made based on a predefined list of SNAPI calls that are to be made by client SNAPI module 2050, and a predefined list of SNAPI calls that are to be made by server SNAPI module 1120. In other examples, certain social networking services 1010-1030 are handled locally, while others are handled remotely. In yet other examples, the host social networking service may be handled locally, while others are handled remotely. In yet other examples, the determination of whether the call is remotely or locally executed is determined dynamically. Client SNAPI module 2050 may keep track of the SNAPI calls that are taking a long time to get a response from the social networking service and begin sending those calls to server SNAPI module 1120 so as not to delay execution of the social networking application 1070.

If the call is to be handled locally, in operation 6050, the SNAPI module determines the correct SNAPI translation or code module or modules, and passes the SNAPI call to each appropriate SNAPI translation module. In some examples, there may be multiple SNAPI translation modules that are called. This is because the application may wish to utilize the functionality of multiple social networks. For example, the application may wish to send messages to users who have connections to the user 1080 on different social networking services 1010-1030. Thus, the SNAPI call facilitates sending messages to other users with connections to user 1080 on social networking services 1010-1030.

In operation 6060, once the translation modules are determined for local calls, and the SNAPI calls are passed into them, the SNAPI translation modules utilize the parameters passed into them by the SNAPI call and construct a social network service-particular API call. Thus in some examples, the translation modules construct a FACEBOOK® API call or a LINKEDIN® API call based on the particular formats of their respective APIs. SNAPI client module 2050 then executes the particular API call. In some examples, this may be a JavaScript call. Other example API calls include using Representational State Transfer (RESTful) APIs utilizing, in some examples, HTTP GET, POST, and PUT requests to various URLs of the social networking service, and in other examples the API may be executed via a PHP call, and the like.

If the SNAPI API call is remote, the client SNAPI module 2050 communicates the request to the server SNAPI module 1120 on the social networking application service 1090 at operation 6070. In some examples, the client SNAPI module 2050 utilizes AJAX to make an HTTP request to the URL address associated with the social networking application service 1090. Other examples include using a specially designed protocol, FTP, TCP sockets, UDP, Internet Messaging Protocol, Internet Relay Chat, Post Office Protocol, Simple Mail Transfer Protocol, and the like. Any means of communicating the SNAPI request to server SNAPI module 1120 on social networking application service 1090 may be used.

Figure 7:
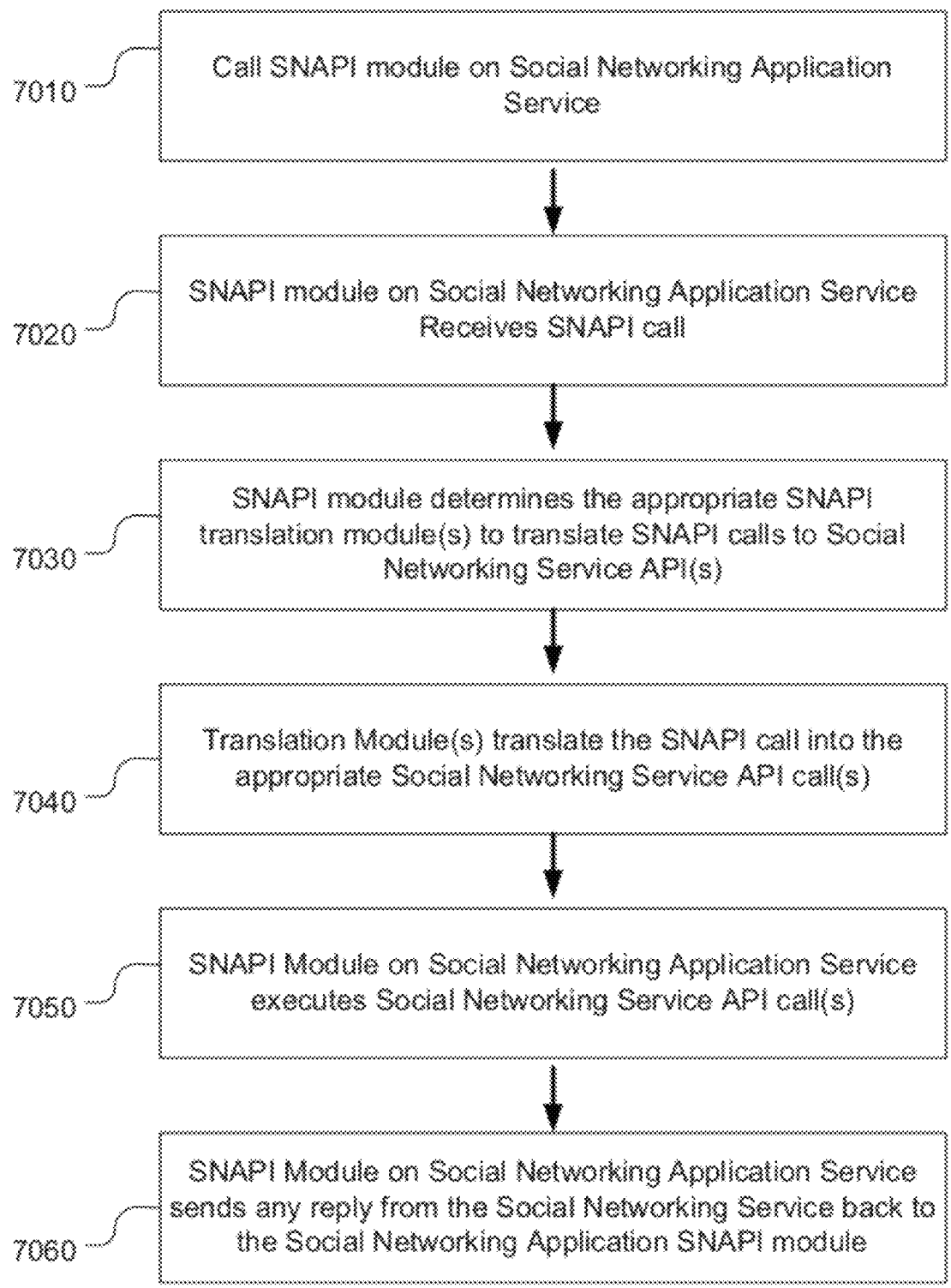
FIG. 7 shows a method of translating SNAPI calls into social network specific calls according to one example of the present disclosure.

One example method showing how the social networking application service server SNAPI module 1120 handles SNAPI calls is shown in FIG. 7. The call may be made by the client SNAPI module 2050 on the social networking application at operation 7010. At operation 7020 the server SNAPI module 1120 receives the SNAPI call. At operation 7030, the server SNAPI module 1120 determines the appropriate SNAPI translation module to translate the SNAPI calls to the specific social networking API calls in a similar manner to the client SNAPI module 2050 on the social networking application. At operation 7040, the translation modules translate the SNAPI calls into social network specific API calls. At operation 7050, the server SNAPI module 1120 on the social networking application service executes the social networking service API calls. In some examples this may be a JavaScript call. Other example API calls include using Representational State Transfer (RESTful) APIs utilizing in some examples: HTTP GET, POST, and PUT requests to various URLs of the social networking service, and in other examples the API may be executed via. a PHP call, HTML or XML tags, and the like. In operation 7060, the SNAPI module on the social networking application service sends any reply from the social networking service back to the client SNAPI module 2050.

Figure 8:
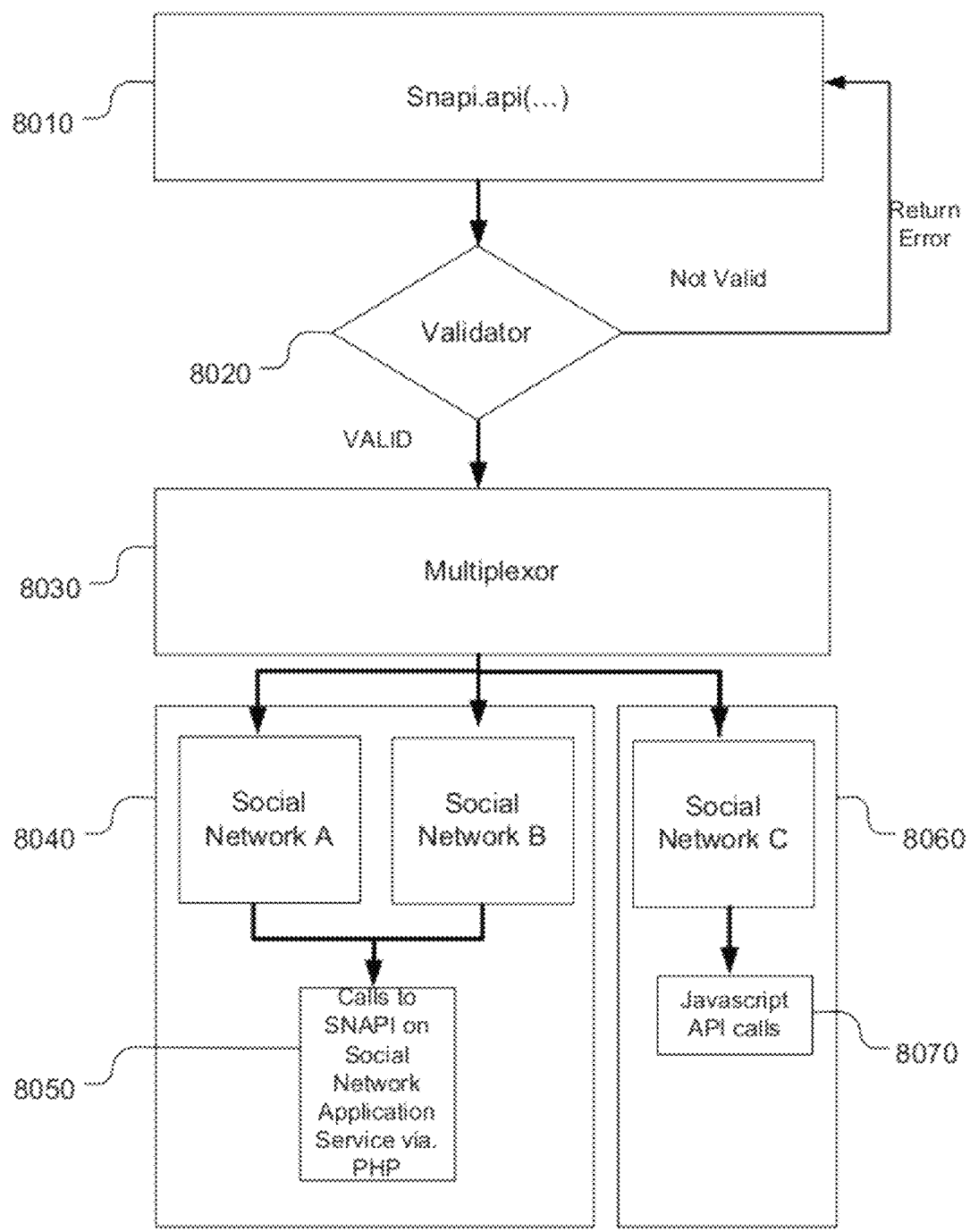
FIG. 8 shows one example of a client SNAPI module.

FIG. 8 shows one example client SNAPI module 2050 of a social networking application 1070. SNAPI call 8010 may be passed into the client SNAPI module 2050 and then validated with validator 8020. Validator 8020 validates the parameters of the API call. If the call is invalid, an error may be returned. If the call is valid, then multiplexor 8030 determines which social networks are the targets of the request. The multiplexor selects social networks that are the target of the request based upon a number of factors which may include: the parameters contained in the SNAPI call, the social networks that have session information available, the type of call (e.g., some social networking services may not support all SNAPI calls, or it may not be desirable to call all social networking services capable of such calls), the host social networking service, the presence or absence of social connections on a specific network, a per-user configuration specifying whether to send calls to all networks or just the current host network, user preferences, and the like. In some examples, some social networking service calls will be processed locally by translator 8060. In this case, translator 8060 converts the SNAPI calls into JavaScript API calls 8070 of social network C 1030 and then executes those calls. In other examples, the social networking calls will be made remotely by remote translators 8040. In some examples, remote translators 8040 pass the SNAPI API calls to the social networking application server via PHP at module 8050. While calls to social network C in this example are handled locally, and calls to social networking service A 1010 and B 1020 are handled remotely, in other examples, some calls to social networking service A 1010 and B 1020 may be handled locally depending on the requested functionality, while some calls for social network C 1030 may be handled remotely depending on the requested functionality. For example, some user interface API calls for the various social networks A-C 1010-1030 may be handled locally by local translator 8060, while other API calls relating to say, messaging, may be handled remotely by remote translators 8040. While two translators are shown in FIG. 8 for simplicity, more may be added to support additional SNAPI calls and additional social networking services.

Figure 9:
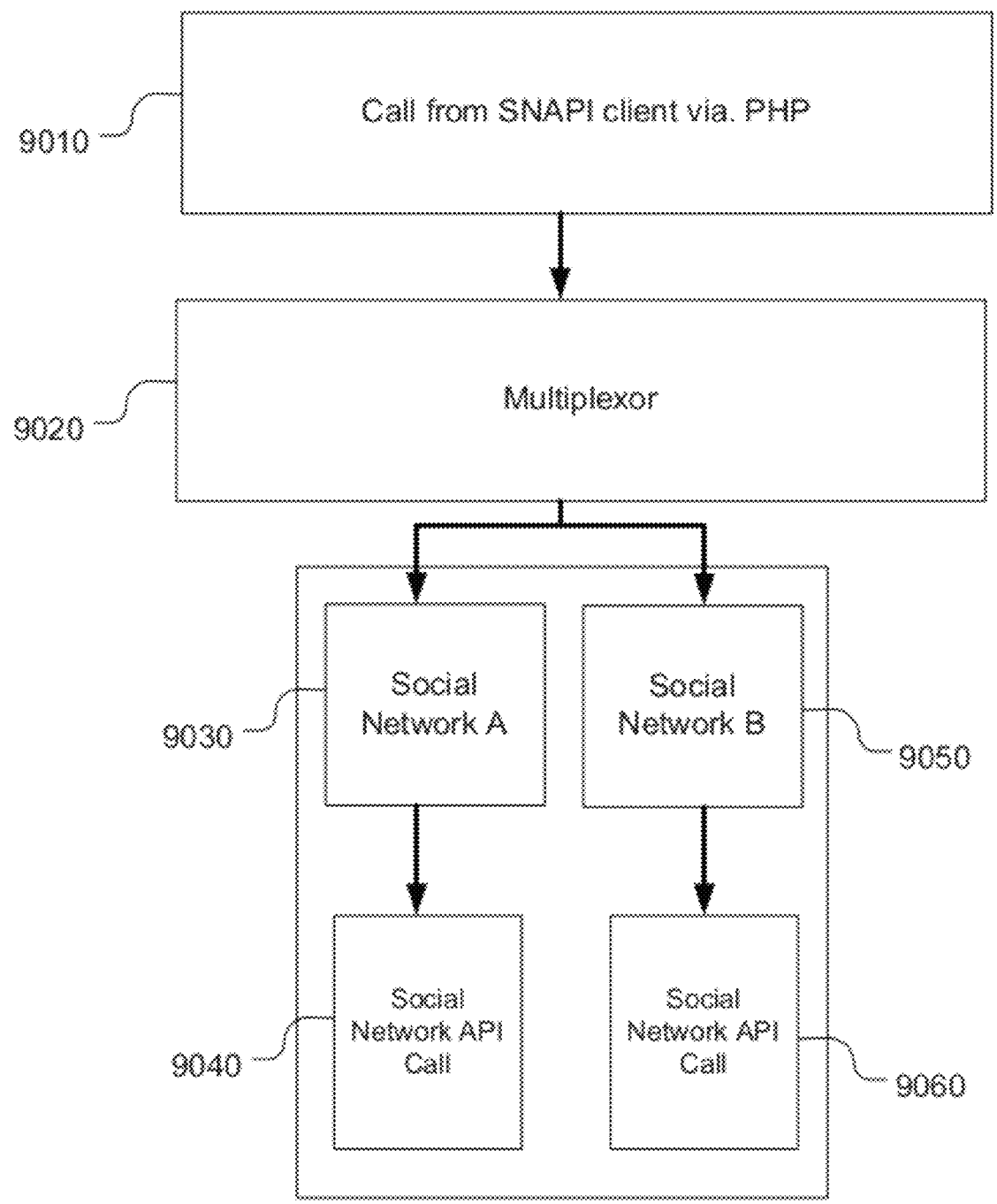
FIG. 9 shows one example of a server SNAPI module.

Turning now to FIG. 9, an example server SNAPI module 1120 on the social networking application service 1090 is shown. The SNAPI call from the social networking application 9010 may be multiplexed by the multiplexor 9020 into one or more translators 9030, 9050. In some examples, only translator 9030 will be selected by multiplexor 9020; in other examples, only translator 9050 will be selected. In yet other examples, both 9030 and 9050 will be selected. Each translator 9030, 9050 then translates the particular SNAPI call into a social network-specific API call 9040, 9060. These API calls may then be sent to the desired social networking service 1010-1030 for processing. As with the client SNAPI module 2050, each translator 9030, 9050 may translate SNAPI calls exclusively for a particular social networking service API, a subset of SNAPI calls for a particular API, or SNAPI calls for multiple social networking service APIs. While two translators are shown in FIG. 9 for simplicity, more may be added to support additional SNAPI calls and additional social networking services.

In some examples, SNAPI modules 2050 and 1120 may provide for certain social networking service API functionality. For example, social networking application 1070 may utilize, or wish to utilize, certain API functionality of a particular social networking service that is not provided by other social networking services. In some examples, this functionality may be common for most social networking services, but not implemented by some other social networking services. In some examples, this functionality includes certain user interface elements. One example is a multi-connection selector. This user interface element displays a box with a list of the social connections (or "friends") associated with the user of the social networking application. The user may then select a number of these connections to whom they wish to send a message, gift, or other interaction. In FACEBOOK®, this is called a multi-friend selector. Other examples include plates, profile pictures, like buttons, single target request buttons, profile information widgets that display certain sections of a user's profile or certain sections of their connection's profiles, feed widgets that embed a stream of social events and posts pertaining to a specific user or item of interest, and the like. A widget is a module of re-usable code that implements a graphical user interface and optionally receives user input and/or displays data.

In some examples, social networking applications utilize the SNAPI provided functionality by using JavaScript SNAPI calls. In other examples, the application may make use of special HTML or XML tags. In some examples, when client SNAPI module 2050 loads, it replaces the HTML or XML tags and JavaScript API calls with JavaScript, HTML, or other code that actually implements the provided functionality. In yet other examples, SNAPI module 2050 checks to see if the host social networking service provides such functionality, and instead of replacing the SNAPI call with the SNAPI implementation, it replaces the SNAPI call with the API call of the host social networking service. For example, if the social networking application had an HTML or XML tag that specified the application would like a multi-friend selector to be displayed, and the host social networking service is FACEBOOK®, then SNAPI module 2050 would replace the SNAPI XML tag with a FACEBOOK® markup (FBML) tag to implement the multi-friend selector. In other examples, even on social networking services that implement the various user interface "UI" features, the SNAPI module 2050 may still use the SNAPI implementation to provide a consistent look and feel to applications across social networking services 1010-1030.

Various Other Notes and Examples

Disclosed in one example is a method for interfacing with multiple social networks. The method may include receiving a call from a social networking service agnostic social networking application for one of a plurality of social networking functions in a first format, translating the call in the first format to a call in a second format, the second format being one of a plurality of heterogeneous social networking service application programming interface formats, the translating done using at least one computer processor. The method may also include passing the call in the second format to a first social networking service by utilizing a first social networking service application programming interface.

Disclosed in another example is a system for interfacing with multiple social networks. The system may include a social networking service agnostic social networking application configured to utilize a plurality of social networking functions, and a translation module implemented on at least one computer processor and configured to: receive a call from the social networking service agnostic social networking application for one of the plurality of social networking functions in a first format; translate the call in a first format to a call in a second format, the second format being one of a plurality of heterogeneous social networking service application programming interface formats; and pass the call in the second format to a first social networking service by utilizing a first social networking service application programming interface.

Disclosed in yet another example is a machine readable storage medium that stores instructions which when performed by a machine, causes the machine to perform various operations. These operations may include receiving a call from a social networking service agnostic social networking application for one of a plurality of social networking functions in a first format, translating the call in the first format to a call in a second format, the second format being one of a plurality of heterogeneous social networking service application programming interface formats, and passing the call in the second format to a first social networking service by utilizing a first social networking service application programming interface.

These examples may be combined in any permutation or combination. This overview is intended to provide an overview of subject matter of the present patent application. It is not intended to provide an exclusive or exhaustive explanation of the invention. The detailed description is included to provide further information about the present patent application.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 10:
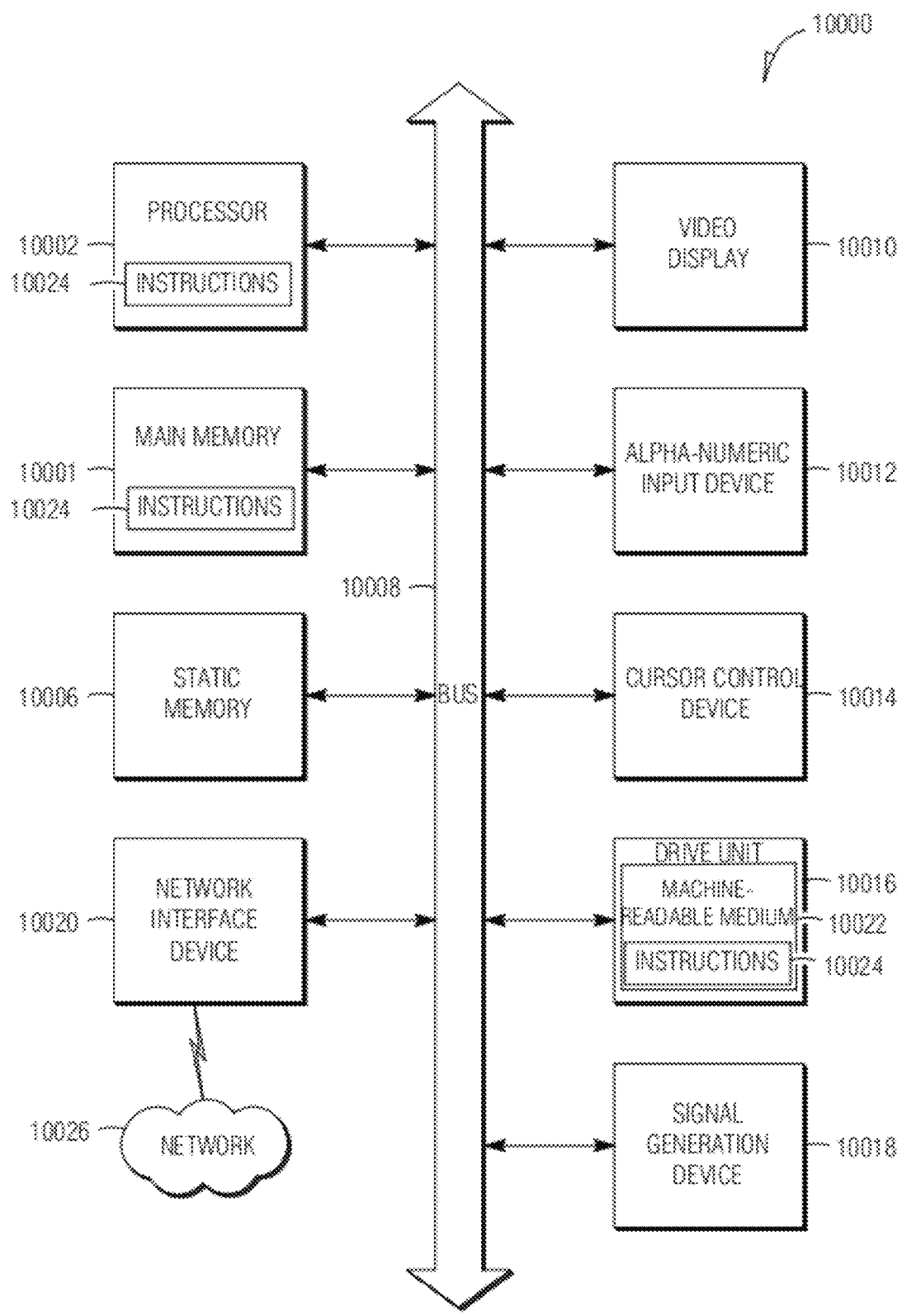
FIG. 10 shows one example of a machine implementation, according to one example.

FIG. 10 shows a diagrammatic representation of a machine in the example form of a computer system 10000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 10000 includes a processor 10002 (e.g., a Central Processing Unit (CPU), a Graphics Processing Unit (GPU) or both), a main memory 10001 and a static memory 10006, which communicate with each other via a bus 10008. The computer system 10000 may further include a video display unit 10010 (e.g., a Liquid Crystal Display (LCD) or a Cathode Ray Tube (CRT)). The computer system 10000 may also include an alphanumeric input device 10012 (e.g., a keyboard), a User Interface (UI) cursor controller 10014 (e.g., a mouse), a disk drive unit 10016, a signal generation device 10018 (e.g., a speaker) and a network interface device 10020 (e.g., a transmitter). In other examples, the machine may include a touch-sensitive display.

The disk drive unit 10016 includes a machine-readable medium 10022 on which is stored one or more sets of instructions 10024 and data structures (e.g., software) embodying or used by any one or more of the methodologies or functions illustrated herein. The software may also reside, completely or at least partially, within the main memory 10001 and/or within the processor 10002 during execution thereof by the computer system 10000, the main memory 10001 and the processor 10002 also constituting machine-readable media.

The instructions 10024 may further be transmitted or received over a network 10026 via the network interface device 10020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic media.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method for interfacing with multiple social networks, the method comprising:
   authenticating a social networking application with a first social networking service, the social networking application being independent of a social networking service;
   receiving authentication information from the first social networking service in response to the authenticating, the authentication information including session information that identifies a session with the first social networking service; and
   passing the authentication information including the session information to a social networking application service, the social networking application service serving the social networking application;
   receiving a first function call in a first format from the social networking application;
   translating the first function call from the first format into a social networking service application programming interface specific format of the first social networking service, the translating being done using at least one computer processor; and
   passing the translated first function call to the first social networking service by utilizing a social networking service application programming interface of the first social networking service.

2. The method of claim 1, further comprising:
   authenticating the social networking application with a second social networking service;
   receiving a second function call in the first format from the social networking application;
   translating the second function call from the first format into a social networking service application programming interface specific format of the second social networking service, the translating being done using at least one computer processor; and
   passing the translated second function call to the second social networking service by utilizing a social networking service application programming interface of the second social networking service.

3. The method of claim 1 further comprising:
determining that the authentication information has not expired before passing the authentication information to the social networking application service.

4. The method of claim 1, further comprising:
receiving a second function call in the first format from the social networking independent social networking application;
determining that the second function call is to be handled remotely;
sending the second function call over a network to a remote translation module of the social networking application service, the remote translation module translating the second function call from the first format into a social networking service application programming interface specific format of a second social networking service; and
passing the translated second function call to the second social networking service by utilizing the second social networking service application programming interface.

5. The method of claim 1, wherein the first function call is a call to determine the connections associated with a user in the first social networking service.

6. The method of claim 1, wherein the first function call is a call to send a message to connections associated with a user in the first social networking service.

7. A system for interfacing with multiple social networks comprising:
at least one computer processor;
a social networking application, the social networking application being independent of a social networking service;
a client authentication module to:
authenticate the social networking application with a first social networking service;
receive authentication information from the first social networking service in response to the authenticating, the authentication information including session information that identifies a session with the first social networking service; and
pass the authentication information including the session information to a social networking application service, the social networking application service serving the social networking application;
a translation module implemented on at least one computer processor and configured to:
receive a first function call in a first format from the social networking application;
translate the first function call from the first format into a social networking service application programming interface specific format of the first social networking service; and
pass the translated first function call to the first social networking service by utilizing a social networking service application programming interface of the first social networking service.

8. The system of claim 7, wherein the client authentication module is further configured to:
authenticate the social networking application with a second social networking service;
and the translation module is further configured to:
receive a second function call in the first format from the social networking application;
translate the second function call from the first format into a social networking service application programming interface specific format of the second social networking service; and
pass the translated second function call to the second social networking service by utilizing a social networking service application programming interface of the second social networking service.

9. The system of claim 8, wherein the client authentication module is further configured to determine that the authentication information has not expired before passing the authentication information to the social networking application service.

10. The system of claim 7, wherein the social networking application is configured to:
receive a second function call in the first format from the social networking application;
determine that the second function call is to be handled remotely;
send the second function call over a network to a remote translation module of the social networking application service, the remote translation module translating the second function call from the first format into a social networking service application programming interface specific format of a second social networking service; and
pass the translated second function call to the second social networking service by utilizing the second social networking service application programming interface.

11. The system of claim 7, wherein the first function call is a function call to determine the connections associated with a user in the first social networking service.

12. A non-transitory computer readable storage medium that stores instructions which when performed by a computer cause the computer to perform operations comprising:
authenticating a social networking application with a first social networking service, the social networking application being independent of a social networking service;
receiving authentication information from the first social networking service in response to the authenticating, the authentication information including session information that identifies a session with the first social networking service; and
passing the authentication information including the session information to a social networking application service, the social networking application service serving the social networking application;
receiving a first function call in a first format from the social networking application;
translating the first function call from the first format into a social networking service application programming interface specific format of the first social networking service; and
passing the translated first function call to the first social networking service by utilizing a social networking service application programming interface of the first social networking service.

13. The non-transitory computer readable storage medium of claim 12, wherein the operations comprise:
authenticating the social networking application with a second social networking service;
receiving a second function call in the first format from the social networking application;
translating the second function call from the first format into a social networking service application programming interface specific format of the second social networking service, the translating being done using at least one computer processor; and
passing the translated second function call to the second social networking service by utilizing a social networking service application programming interface of the second social networking service.

14. The non-transitory computer readable storage medium of claim 12 wherein the operations comprise:
   determining that the authentication information has not expired before passing the authentication information to the social networking application service.

15. The non-transitory computer readable storage medium of claim 12, wherein the operations comprise:
   receiving a second function call in the first format from the social networking application;
   determining that the second function call is to be handled remotely;
   sending the second function call over a network to a remote translation module of the social networking application service, the remote translation module translating the second function call from the first format into a social networking service application programming interface specific format of a second social networking service; and
   passing the translated second function call to the second social networking service by utilizing the second social networking service application programming interface.

16. The non-transitory computer readable storage medium of claim 12, wherein the first function call is a call to determine the connections associated with a user in the first social networking service.

17. The non-transitory computer readable storage medium of claim 12, wherein the first function call is a call to send a message to connections associated with a user in the first social networking service.

* * * * *

UNITED STATES PATENT AND TRADEMARK OFFICE
CERTIFICATE OF CORRECTION

| | | |
|---|---|---|
| PATENT NO. | : 8,296,784 B1 | Page 1 of 1 |
| APPLICATION NO. | : 13/244942 | |
| DATED | : October 23, 2012 | |
| INVENTOR(S) | : Brown et al. | |

It is certified that error appears in the above-identified patent and that said Letters Patent is hereby corrected as shown below:

IN THE CLAIMS:

In column 19, line 7, in Claim 4, after "social networking", delete "independent social networking", therefor Signed and Sealed this
Twenty-fourth Day of February, 2015

Michelle K. Lee
*Deputy Director of the United States Patent and Trademark Office*